May 17, 1932.    H. E. ENDERS    1,858,295
CALCULATING MACHINE
Filed Aug. 15, 1929    2 Sheets-Sheet 1

Hugo E. Enders INVENTOR.
BY W. A. Sparks
his ATTORNEY.

May 17, 1932.  H. E. ENDERS  1,858,295
CALCULATING MACHINE
Filed Aug. 15, 1929   2 Sheets-Sheet 2

INVENTOR.
Hugo E. Enders
BY W. A. Sparks
his ATTORNEY.

Patented May 17, 1932

1,858,295

UNITED STATES PATENT OFFICE

HUGO E. ENDERS, OF BELLEVILLE, NEW JERSEY, ASSIGNOR TO MONROE CALCULATING MACHINE COMPANY, OF ORANGE, NEW JERSEY, A CORPORATION OF DELAWARE

CALCULATING MACHINE

Application filed August 15, 1929. Serial No. 386,042.

This invention relates to calculating machines and particularly to calculating machines having a transversely movable carriage for moving the accumulators from one denominational position to another.

The principal object of the invention is to provide means for moving the carriage in a straight line or substantially in a straight line cross-wise of the machine while keeping the same constantly under control.

Another object of the invention is to provide carriage moving means which is simple of construction, comparatively inexpensive to manufacture, applicable to machines as now manufactured without a re-design of the known mechanism, and highly efficient for the purpose for which it is designed.

Other objects will be apparent from the following description and appended claims, all of these objects are attained by mechanism illustrated in the accompanying drawings, in which:

Like characters of reference refer to like parts in all views.

Figure 1:
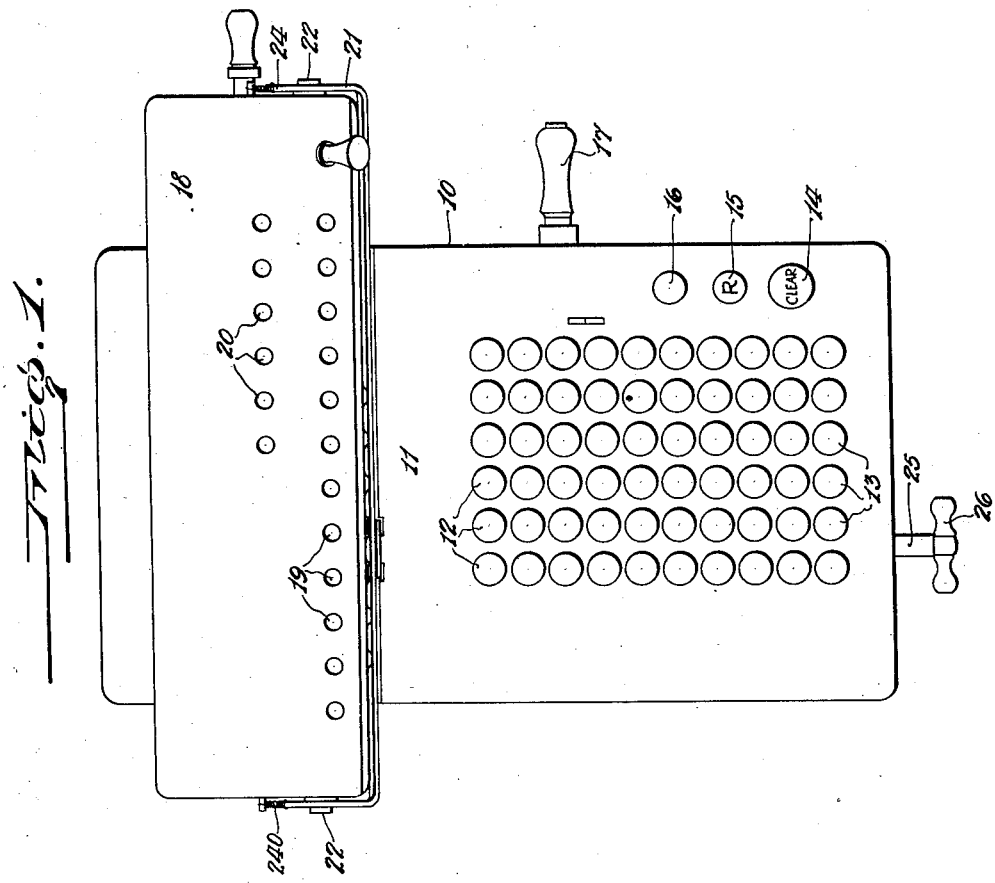
Fig. 1 is a top plan view of a machine embodying my invention.

In illustrating my invention I have chosen to show the same as applied to a calculator of the well known Monroe type, but this is to be understood as merely illustrative, as the invention is applicable to various types of calculating machines. In the Monroe machine as placed on the market, the carriage is lifted, then moved to its new position and lowered. One form of this type of carriage is shown in the Reissue Patent No. 13,841 granted to F. S. Baldwin, December 8, 1914.

The present invention shows a means of moving the carriage from one position to another without lifting the same, although it is to be understood that it is also contemplated as part of the invention that where certain forms of accumulators and actuators are used, the carriage may be moved slightly up and down so as to permit disengagement and engagement of the coacting gears.

Referring to the drawings in detail, 10 represents the casing and frame of a calculating machine. The keyboard frame is shown at 11 and guides a plurality of manipulative members as follows: digit-setting keys 12, zero keys 13, keyboard clear key 14, repeat key 15, and nonrepeat key 16. An operating crank is shown at 17, and the carriage at 18. The carriage carries a plurality of accumulators 19 and a set of counters 20.

While I have chosen to show my invention as applied to a six-bank hand-operated Monroe calculating machine, it is to be understood that the invention is applicable to the larger types of machine and also to electrically driven and full automatic machines of this type. While accumulators and counters have been indicated at 19 and 20, accumulators and counting mechanism form no part of this invention and may be of any style suitable.

The means for engaging the accumulators and counters with their actuating means is also not an essential part of this invention and may be of any well known type. For instance, the accumulator gears may be larger than the dials so as to permit a straight horizontal movement of the carriage from one actuator engaging position to another; or intermediate gears may be used and the actuators engaged with such intermediate gears or the intermediate gears swung into and out of effective position; or the accumulators may be placed on the upper surface of the carriage and gearing connected through the carriage to the actuators; or a slight vertical movement of the carriage may be allowed during transverse movement of the carriage so as to permit the actuating gears to escape the dials. No doubt there are other known means for accomplishing the desired end.

However, as all of these means are well known in the art, I do not consider this as an essential feature of the invention, the particular style of accumulators and actuator engaging means being merely a matter of choice with the designer.

Figure 3:
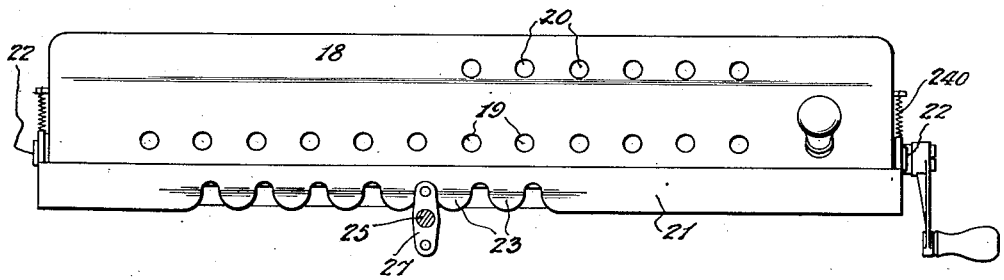
Fig. 3 is a view similar to Fig. 2 but showing the parts during transit of the carriage from one position to another.
Figure 5:
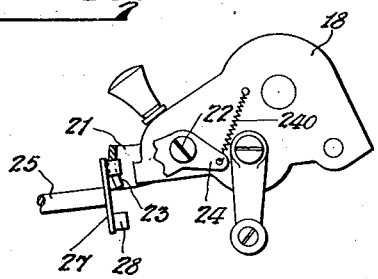
Fig. 5 is a view similar to Fig. 4 but showing the position of the parts during transit of the carriage and with the swinging bail broken away to show the contour of the teeth.
Figure 4:
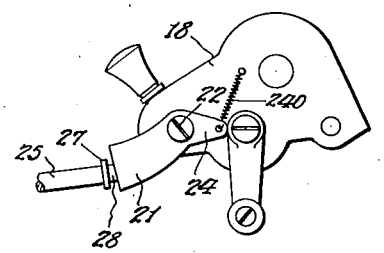
Fig. 4 is a detail end elevation of the carriage with parts in normal position.

A swinging bail is indicated at 21 and is pivoted at opposite ends of the carriage 18 as at 22, and extends completely across the front of the carriage. This bail is formed with teeth 23 the lower portions of which are curved as shown at Fig. 5 so as to avoid interference with the keyboard and with the carriage-moving cross-arm or crank when the bail is moved to its upper position as shown in Fig. 3. The teeth 23 form a rack for cooperation with elements hereinafter described.

In rear of the pivots 22, the bent up portions of the bail 21 are extended at 24 so that if necessary, springs 240 may be secured to the elements 24 and anchored to the carriage frame 18 in order to insure the bail following the movement of the carriage-shift arm. This is not essential in a hand-operated machine, where gravity has been found sufficient, but in motor driven machines where the movement may be very rapid, the assistance of springs may be found desirable.

Figure 2:
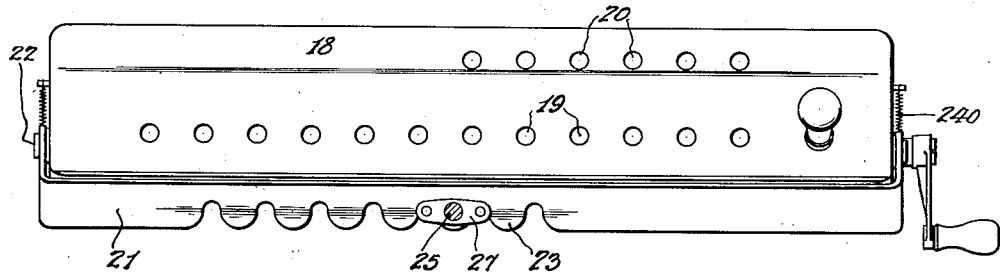
Fig. 2 is a detail front elevation of the carriage, the carriage-moving shaft being shown in section, and the position of the parts being normal.

Mounted on the underside of the keyboard 11 is a carriage shifting shaft 25 which may be rotated by means of a handle 26. Secured to the rear end of the shaft 25 is a cross-arm or crank 27 carrying rollers 28 which are adapted to engage between teeth 23 of the swinging bail 21. Normally both of the rollers 28 engage adjacent notches between teeth 23 as shown in Fig. 2. Rotation of the shaft 25 by means of the handle 26, will cause one or the other of the rollers 28 to lift the bail 21 and concomitantly shift the carriage in a corresponding direction. The position of the parts during transit of the carriage is shown in Figs. 3 and 5. Upon the shaft 25 completing a half revolution both rollers will again be in engagement between teeth 23 and the carriage will have been moved one denominational space. It will be noted that the carriage is thus constantly under control of the shaft 25 and crank 27 altho it is being moved laterally without being lifted. In other words, in the action of the shifting crank, one pin or roller 28 acts to raise the rack, shift the carriage, and let the rack down, the other pin being brought into engagement with the rack to hold the parts in position to prevent casual movement of the carriage. Springs 240 insure engagement of the rack and members 28. If it should be desired to not only move the carriage laterally but also to slightly lift the carriage vertically during each movement, the rollers 28 may be extended sufficiently to engage the under side of the carriage or a ledge on the carriage frame so as to effect the desired slight vertical movement.

While I have described what I consider to be the most desirable embodiment of my invention for the purpose set forth, it is obvious that changes in form could be made without departing from the spirit of my invention, and I, therefore, do not limit myself to the exact details herein shown and described, or to anything less than the whole of my invention as hereinafter particularly pointed out in the claims.

I claim:

1. In a calculating machine, the combination of a rotatable shaft, crank elements carried thereby, a register carriage, and a swinging bail mounted on said carriage and formed with a serrated edge adapted to rest upon and mesh with said crank elements at two spaced points, and means for rotating said shaft, to swing the bail relatively to the carriage and effect shifting of the carriage.

2. In a calculating machine, the combination with registers, of a transversely movable carriage supporting said registers, a rack pivotally supported on said carriage, an element engageable with said rack and normally held thereby in position for locking said carriage against lateral displacement, and means cooperative with said rack for first pivoting said rack relatively to said carriage to effect disengagement of said rack and element, then effecting transverse movement of said carriage, and then effecting re-engagement of said rack and element.

In testimony whereof I affix my signature.

HUGO E. ENDERS.